(12) United States Patent
Drerup et al.

(10) Patent No.: US 6,973,520 B2
(45) Date of Patent: Dec. 6, 2005

(54) SYSTEM AND METHOD FOR PROVIDING IMPROVED BUS UTILIZATION VIA TARGET DIRECTED COMPLETION

(75) Inventors: Bernard Charles Drerup, Austin, TX (US); Jaya Prakash Subramaniam Ganasan, Youngsville, NC (US); Richard Gerard Hofmann, Apex, NC (US); Richard Nicholas Iachetta, Jr., Pflugerville, TX (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 10/195,172

(22) Filed: Jul. 11, 2002

(65) Prior Publication Data

US 2004/0010644 A1    Jan. 15, 2004

(51) Int. Cl.[7] .......................... G06F 13/00; G06F 13/14
(52) U.S. Cl. ...................... 710/110; 710/105; 710/107; 710/108
(58) Field of Search .............................. 710/28, 40, 49, 710/107, 110, 240, 242, 244

(56) References Cited

U.S. PATENT DOCUMENTS

| | | | |
|---|---|---|---|
| 5,392,404 A * | 2/1995 | Thompson | 710/40 |
| 5,613,076 A | 3/1997 | Latif et al. | |
| 5,764,929 A * | 6/1998 | Kelley et al. | 710/107 |
| 5,765,022 A | 6/1998 | Kaiser et al. | |
| 5,850,530 A * | 12/1998 | Chen et al. | 710/113 |
| 5,881,255 A | 3/1999 | Kondo et al. | |
| 5,941,967 A * | 8/1999 | Zulian | 710/107 |
| 5,996,036 A | 11/1999 | Kelly | |
| 6,061,753 A | 5/2000 | Ericson | |
| 6,185,651 B1 | 2/2001 | Monia et al. | |
| 6,275,887 B1 | 8/2001 | Derr et al. | |
| 6,282,598 B1 * | 8/2001 | Manabe | 710/107 |
| 6,324,617 B1 | 11/2001 | Arimilli et al. | |

(Continued)

FOREIGN PATENT DOCUMENTS

JP        2000207354 A  *  7/2000   ......... G06F 13/362

OTHER PUBLICATIONS

Kaufman,J. S.;"Blocking in a Completely Shared Resource Environment with State Dependent Resource and Residency Requirements"; INFOCOM '92. Eleventh Annual Joint Conference of the IEEE Computer and Communications Societies;IEEE; May 8, 1992;pp. 2224-2232.*

(Continued)

*Primary Examiner*—Paul R. Myers
*Assistant Examiner*—Ryan Stiglic
(74) *Attorney, Agent, or Firm*—Carr LLP; Diana R. Gerhardt (57) ABSTRACT

An electronic system is disclosed, including multiple initiators and one or more targets coupled to a bus, and a request mask control unit (RMCU). The initiators are configured to initiate requests (e.g., read requests and write requests) via the bus, and the targets are configured to receive requests from the initiators via the bus. The targets are also configured to produce multiple MaskEnable signals, wherein each of the MaskEnable signals is generated following an initial request received via the bus, and dependent on a corresponding "masking situation" within the target. The RMCU receives the MaskEnable signals and produces multiple RequestMask signals dependent upon the MaskEnable signals. One or more of the initiators are permitted to repeat requests via the bus dependent upon one or more of the RequestMask signals. This mechanism provides additional bus bandwidth for carrying out successful data transfers.

23 Claims, 6 Drawing Sheets

U.S. PATENT DOCUMENTS

| | | | |
|---|---|---|---|
| 6,343,344 B1 | 1/2002 | Arimilli et al. | |
| 6,397,279 B1 * | 5/2002 | Jaramillo et al. | 710/110 |
| 6,598,104 B1 * | 7/2003 | Jaramillo et al. | 710/110 |
| 2002/0184421 A1 * | 12/2002 | Weber et al. | 710/107 |

OTHER PUBLICATIONS

"Structure for Controlling Small Computer System Interface Logical Devices in an Independent and Overlapped Manner"; *IBM Technical Disclosure Bulletin*; Jun. 1990; vol. 33, No. 1A; pp. 330-332.

"Automatic Target Mode for the Small Computer System Interface"; *IBM Technical Disclosure Bulletin*; Oct. 1990; vol. 33, No. 5; pp. 130-133.

Khalil, A.H., et al.; "FPGA Implemented Fast Two's Complement Serial-parallel Multiplier With PCI Interface"; *IEEE*, Dec. 14-16, 1998; pp. 21-24.

Hayashi, Y. et al.; "Implementation and Evaluation for Dependable Bus Control Using CPLD"; *IEEE*; Apr. 2000; pp. 11-18.

U.S. Appl. No. 09/740,178.

* cited by examiner

SYSTEM AND METHOD FOR PROVIDING IMPROVED BUS UTILIZATION VIA TARGET DIRECTED COMPLETION

BACKGROUND OF THE INVENTION

1. Field of the Invention

This invention relates generally to electronic bus structures, and, more particularly, to systems and methods for communicating via bus structures.

2. Description of the Related Art

Computer systems and other digital electronic systems often include multiple devices connected to one or more sets of wires or signal lines called buses. The devices are interconnected via the buses and communicate via the buses using protocols established for the buses. Such buses have relatively low cost, and new devices can easily be added to systems and/or moved between systems using the same bus standard.

In general, there are two main types of devices configured to be connected to buses. These include initiators (sometimes called bus master devices) and targets. An initiator is a device configured to initiate transactions (e.g., read or write operations) via the bus. A target is a device configured to respond to transactions directed to the device. Each target device typically has a unique address.

An initiator connected to a bus typically communicates with a target device operably coupled to the same bus by driving the address of the target device, and other control information about the transaction, on signal lines of the bus according to the bus protocol. Upon detecting its address in the signal lines of the bus, and possibly dependent upon the control information, the target device responds to the transaction by carrying out predefined activities or actions. Many devices have the capability of being both an initiator and a target.

Only one initiator may control a bus at any given time. In systems with more than one initiator connected to a bus, an arbiter typically arbitrates among the initiators for control of the bus.

A digital electronic system, such as a computer system, typically includes one or more initiator devices and several target devices connected to a bus. Each target device "listens" to each transaction requested by the one or more initiators. If a target determines that a transaction is directed to it, the target may "claim" the transaction according to the bus protocol. The initiator and target then complete the transaction according to the bus protocol. For example, if the transaction is a write transaction, the initiator drives write data on signal lines of the bus and the target accepts the write data. If the transaction is a read transaction, the target drives read data on the signal lines of the bus and the initiator accepts the read data.

Bus performance is, in large part, determined by the efficiency of the transactions carried out via the bus. In general, communications or "traffic" on a typical bus can be categorized into three types of transactions: 1) requests that transfer data, 2) new requests that do not transfer data, and 3) repeated requests that do not transfer data. When the initiator and the target are both ready to transfer data, requests expectedly result in successful transfers of data. For this reason, many bus protocols do not allow an initiator to make a request until it is ready to transfer data.

Targets often have situations where they cannot transfer data immediately. For example, a target may have no free storage space for storing write data or may first need to acquire read data from a relatively slow (i.e., high latency) source. Many bus protocols discourage or disallow targets from holding the bus in a wait state until they can transfer data. According to some bus protocols, when a target encounters a new request and determines that it is not ready to transfer data, it should (or must) "retry" the request. When a target retries a request, the transaction is halted and the initiator must reinitiate the transaction at a later time. In many systems, such request retries may result in requests being repeated several times and repeated until targets are finally able to transfer data.

For example, the Processor Local Bus (PLB) is a high performance on-chip bus typically used to interconnect multiple cores (functional blocks or units) to form an integrated circuit that functions as a system-on-a-chip. The PLB bus is one the CoreConnect™ bus architectures (IBM Corporation, White Plains, N.Y.). In a conventional PLB, a target receiving a request via the PLB must either complete the request or retry the request. Initiators that can have only one request pending at any given time repeat retried requests until the requests are completed. An initiator that can have multiple requests pending at any given time may initiate one request via the PLB and, if that request is retried, the initiator may initiate another request via the PLB. However, the initiator must eventually repeat all retried requests until the requests are completed.

A problem arises in systems with buses having protocols that encourage or require target devices to retry requests when not ready to transfer data and include relatively slow (i.e., high latency) target devices. In such systems, a substantial amount of bus bandwidth is often used to repeat requests that do not transfer data. Bus bandwidth refers to the total amount of data that can be transmitted via a bus per unit of time. Bus bandwidth used to repeat requests that do not transfer data could be used by other devices to carry out successful data transfers; thus, repeated requests that do not transfer reduce bus performance.

SUMMARY OF THE INVENTION

An electronic system is disclosed, including multiple initiators and one or more targets coupled to a bus, and a request mask control unit (RMCU). The initiators are configured to initiate requests (e.g., read requests and write requests) via the bus, and the targets are configured to receive requests from the initiators via the bus. The targets are also configured to produce multiple MaskEnable signals, wherein each of the MaskEnable signals is generated following an initial request received via the bus and dependent on a corresponding "masking situation" within the target. Exemplary masking situations include "delayed read," "no read buffer available," and "no write buffer available." The RMCU receives the MaskEnable signals and produces multiple RequestMask signals dependent upon the MaskEnable signals. One or more of the initiators are permitted to repeat requests via the bus dependent upon one or more of the RequestMask signals. From another point of view, the one or more initiators are prevented from repeating requests via the bus dependent upon the one or more RequestMask signals. Methods for initiating requests via a bus, receiving requests via a bus, and communicating via a bus, are also described.

Target-directed completion of requests can be advantageously provided via a fixed and relatively small number of MaskEnable signals that can be used to control an arbitrarily large number of requests from an arbitrarily large number of initiators. Furthermore, the targets do not mask specific initiators. Instead, the targets generate the MaskEnable signals, and the RMCU converts (i.e., maps) the MaskEnable signals to corresponding RequestMask signals. In one embodiment, the RequestMask signals, while asserted, prevent one or more of the initiators from repeating requests via the bus. As less of the bus bandwidth is used to repeat requests, more of the bus bandwidth is available for requests more likely to transfer data, and bus performance is expectedly increased.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of this disclosure.

Figure 1:
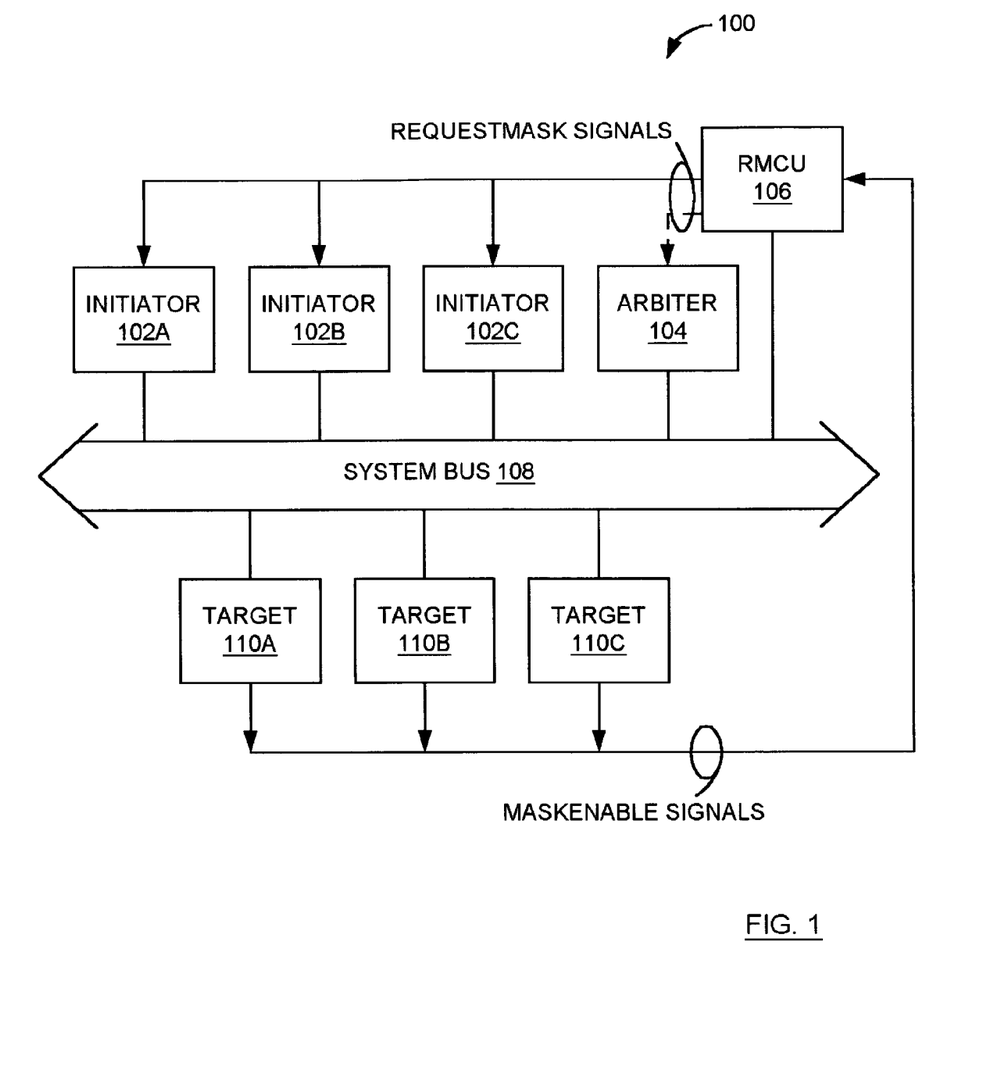
FIG. 1 is a diagram of one embodiment of an electronic system including a system bus interconnecting multiple initiator devices (initiators), multiple target devices (targets), an arbiter, and a request mask control unit (RMCU)

FIG. 1 is a diagram of one embodiment of an electronic system 100 including a system bus 108 interconnecting multiple initiator devices (initiators) 102A–102C, multiple target devices (targets) 110A–110C, an arbiter 104, and a request mask control unit (RMCU) 106. The electronic system 100 may be, for example, a computer system. In this situation, one of the initiators 102 may be a central processing unit (CPU), and the targets 110 may be peripheral devices. For example, the targets 110 may include disk drives, printers, scanners, modems, and the like. The electronic system 100 may form a part of a larger system. For example, the electronic system 100 may be a computer system forming a part of (i.e., "embedded" in) a larger communication system, control system, measurement system, or other system requiring the capabilities of a computer system.

The initiators 102A–102C (referred to collectively below as initiators 102) and the targets 110A–110C (referred to collectively below as targets 110) communicate via the system bus 108. Each of the initiators 102 is capable of initiating transactions (e.g., read and write operations or "requests") via the system bus 108. Each of the targets 110 is configured to respond to transactions on the system bus 108 directed to the device. Each of the targets may have, for example, a unique address within the electronic system 100, and transactions on the system bus 108 directed to individual targets 110 may include the unique addresses of the individual targets 110.

In general, the system bus 108 may be any bus having a protocol that allows "retries" and "delayed transactions." A bus protocol allowing retries allows targets not ready to transfer data to signal a "retry" to initiators (i.e., to "retry" requests). A bus protocol allowing "delayed transactions," such as delayed read transactions or "delayed reads" and/or delayed write transactions or "delayed writes," allows a target to retry a request, then begin processing the request after retrying the request. Examples of buses that allow "retries" and "delayed transactions" include the peripheral local bus (PLB), the "60X" PowerPC microprocessor bus, and the popular peripheral component interconnect (PCI) bus.

The arbiter 104 arbitrates between the initiators 102 for control of the system bus 108. In one embodiment of the electronic system 100, the arbiter 104 may be a standard arbiter receiving a bus request (request) signal from each of the initiators 102 and providing a bus grant (grant) signal to each of the initiators 102. An initiator 102 needing to use the system bus 108 asserts the corresponding request signal. When the grant signal received by the initiator 102 is asserted, the initiator 102 has been granted control of the bus by the arbiter 104. The arbiter 104 generates the grant signals such that only one of the initiators 102 has control of the system bus 108 at any given time. In other embodiments of the electronic system 100 described in detail below, the arbiter 104 uses other signals in addition to the request signals to generate the grant signals.

As indicated in FIG. 1, the request mask control unit (RMCU) 106 receives one or more MaskEnable signals from each of the targets 110. In general, the RMCU 106 produces the RequestMask signals dependent upon the MaskEnable signals. In other words, the RMCU 106 "maps" the MaskEnable signals received from the targets 110 to RequestMask signals. The RMCU 106 provides the RequestMask signals to the initiators 102 and/or the arbiter 104.

In one embodiment of the electronic system 100, each of the targets 110 provides a fixed number of the MaskEnable signals to the RMCU 106 and asserts each of the MaskEnable signals dependent upon the occurrence of a corresponding "masking situation" within the target 110. As defined herein, a "masking situation" is a reason why a request (e.g., a read request or a write request) should not be repeated via the system bus 108. For each of the targets 110, a given masking situation has a single corresponding MaskEnable signal. In one exemplary masking situation, a target 110 receives a new read request via the system bus 108, a read buffer within the target 110 is available, and the read request is queued (i.e., the read request is a delayed read). This masking situation typically masks a single read request. It is noted that there may be separate masking situations associated with each of the multiple read buffers.

In another exemplary masking situation, a target 110 receives a new read request via the system bus 108, and no read buffer is available. This masking situation may mask multiple read requests. In still another exemplary masking situation, a target 110 receives a new write request, and no write buffer is available. This masking situation may mask multiple write requests. Other variations and exemplary masking situations will be apparent to those skilled in the art.

In one embodiment of the electronic system 100, each of the initiators 102 is capable of having multiple requests (e.g., read or write requests) pending at any given time. In this situation, each of the initiators 102 receives a number of RequestMask signals from the RMCU 106 equal to the number of pending requests the initiator 102 is permitted, and each RequestMask signal received by a given initiator 102 corresponds to a different pending request. In general, when an initiator 102 initiates a request via the system bus 108, and the RMCU 106 asserts the corresponding RequestMask signal, the initiator 102 is prevented from repeating the corresponding pending request until the RMCU 106 deasserts the corresponding RequestMask signal.

In some embodiments of the electronic system 100, the RMCU 106 provides RequestMask signals to the arbiter 104. For example, one or more of the initiators 102 may be capable of having only a single request pending at any given time. In this situation, the RMCU 106 produces a single RequestMask signal for each of these initiators 102, and provides the RequestMask signals to either the corresponding initiators 102 or to the arbiter 104.

When the RMCU 106 provides a RequestMask signal to an initiator 102 capable of having only a single request pending at any given time, and the initiator 102 initiates a request via the system bus 108, and receives an asserted RequestMask signal from the RMCU 106, the initiator 102 is prevented from repeating the request until the RMCU 106 deasserts the RequestMask signal.

When the RMCU 106 produces a RequestMask signal for an initiator 102 capable of having only a single request pending at any given time and provides the RequestMask signal to the arbiter 104, and the arbiter 104 receives an asserted RequestMask signal from the RMCU 106, the arbiter 104 does not assert the grant signal corresponding to the initiator 102 (i.e., is prevented from granting the initiator 102 control of the system bus 108). As a result, the initiator 102 is prevented from repeating the request until the RMCU 106 deasserts the RequestMask signal.

In one embodiment of the electronic system 100, each of the initiators 102 has a different InitiatorID, and each pending request a given initiator 102 can initiate has a different BufferID. All requests initiated via the system bus 108 include the InitiatorID identifying the initiator 102, and the BufferID identifying the corresponding pending request number. The RMCU 106 constantly monitors the system bus 108, and stores (i.e., latches) the InitiatorID and the BufferID of each request initiated via the system bus 108.

When a target 110 receives a request, and a masking situation exists in the target 110 that prevents the target 110 from servicing the request, the target 110 retries the request, and asserts the MaskEnable signal corresponding to the masking situation. For example, the target 110 may signal the retry during one cycle of a synchronizing clock signal of the system bus 108, and assert the MaskEnable signal during the next clock cycle. The RMCU 106 detects the request retry via the system bus 108 and receives the asserted MaskEnable signal. The RMCU 106 responds to the detected request retry and the asserted MaskEnable signal by asserting a RequestMask signal directed to the initiator 102 identified by the InitiatorID and corresponding to the request number identified by the BufferID.

The RMCU 106 may include a register for each of the RequestMask signals. When the RMCU 106 asserts a RequestMask signal, the RMCU 106 may store a value assigned to the MaskEnable signal (e.g., a MaskEnablePointer value) in the register associated with the RequestMask signal. In this situation, the MaskEnablePointer value identifies the MaskEnable signal that caused assertion of the RequestMask signal. Other requests may subsequently be retried and masked, either by the same masking event, such that a single MaskEnable signal is associated with multiple masked requests, or by different masking events.

When the masking event no longer exists within the target 110, the target 110 deasserts the corresponding MaskEnable signal (e.g., for two or more clock cycles). In response to the deassertion of the MaskEnable signal, the RMCU 106 may check all of the registers associated with the RequestMask signals and deassert RequestMask signals corresponding to registers that have the MaskEnablePointer value of the deasserted MaskEnable signal stored therein. When the RequestMask signals are deasserted, the associated requests may be repeated.

It is noted that in other embodiments, the electronic system 100 may include one or more of the targets 110 that do not generate MaskEnable signals. For example, the one or more targets 110 may not retry requests via the system bus 108, and may not generate MaskEnable signals.

Figure 2:
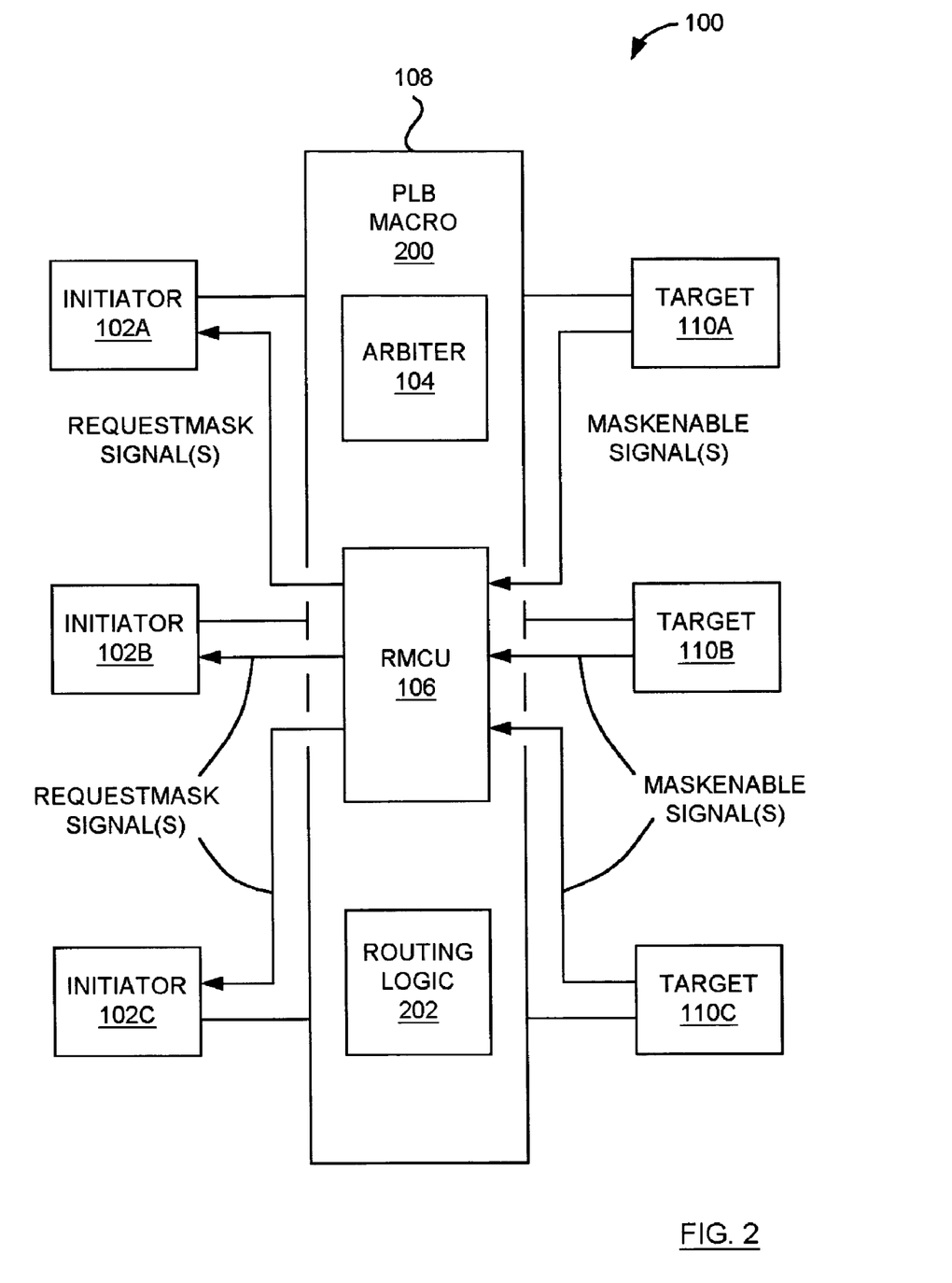
FIG. 2 is a diagram of the electronic system of FIG. 1, wherein the system bus is a Processor Local Bus (PLB), and wherein the RMCU receives one or more MaskEnable signals from each of the targets, produces RequestMask signals dependent upon the MaskEnable signals, and provides the RequestMask signals to the initiators.

FIG. 2 is a diagram of the electronic system 100 of FIG. 1, wherein the system bus 108 is a Processor Local Bus (PLB), and wherein the RMCU 106 receives one or more MaskEnable signals from each of the targets 110, produces the RequestMask signals dependent upon the MaskEnable signals, and provides the RequestMask signals to the initiators 102. As described above, the Processor Local Bus (PLB) is a high performance on-chip bus typically used to interconnect multiple cores (functional blocks or units) to form an integrated circuit that functions as a system-on-a-chip. In this situation, the initiators 102 may include bus bridges, direct memory access (DMA) controllers, communication controllers, and the like. The targets 110 may include memory controllers, interrupt controllers, bus bridges, communication controllers, and the like.

In the embodiment of FIG. 2, the initiators 102 and the targets 110 are connected to a central PLB macro 200. Routing logic 202 within the PLB macro 200 selectively interconnects the initiators 102 and the targets 110, enabling communication between initiators 102 and the targets 110. The routing logic 202 is typically implemented via multiplexer logic. In the PLB embodiment of FIG. 2, the arbiter 104 is part of the PLB macro 200 and controls time-multiplexed use of the bus signal lines when multiple initiators 102 request access to the same target 110 simultaneously.

In the embodiment of FIG. 2, each of the initiators 102 asserts a corresponding request signal to the arbiter 104 when the initiator 102 needs to access a target 110. The arbiter 104 provides a grant signal to each of the initiators 102, and a given initiator 102 is granted access to the target 110 via the routing logic 202 within the PLB macro 200 when the corresponding grant signal is asserted. The grant signals are also used to control the routing logic 202 so that signals from the controlling initiator 102 granted control are routed to the target 110, and signals from the target 110 are routed to the controlling initiator 102.

In the PLB embodiment of FIG. 2, a target 110 that receives a request may indicate either completion of the request or a retry of the request. When the target 110 indicates a retry, the initiator 102 must repeat the request at a later time.

When making a request to the PLB macro 200 (i.e., to the PLB), an initiator 102 provides a BufferID to the PLB 200. In general, the BufferID identifies the pending request. For example, the BufferID may be a unique value among multiple requests that the initiator can have pending to the PLB at one time. When the PLB macro 200 grants an initiator 102 use of the PLB, the PLB macro 200 generates an InitiatorID identifying the initiator 102 granted use.

In the embodiment of FIG. 2, the RMCU 106 receives one or more MaskEnable signals from each of the targets 110, produces the RequestMask signals dependent upon the MaskEnable signals, and provides the RequestMask signals to the initiators 102. The RMCU 106 constantly monitors signals within the PLB macro 200, and may store (i.e., latch) the InitiatorID and the BufferID of each request initiated via the PLB, and use the InitiatorID and the BufferID to generate the RequestMask signals as described above.

Figure 3:
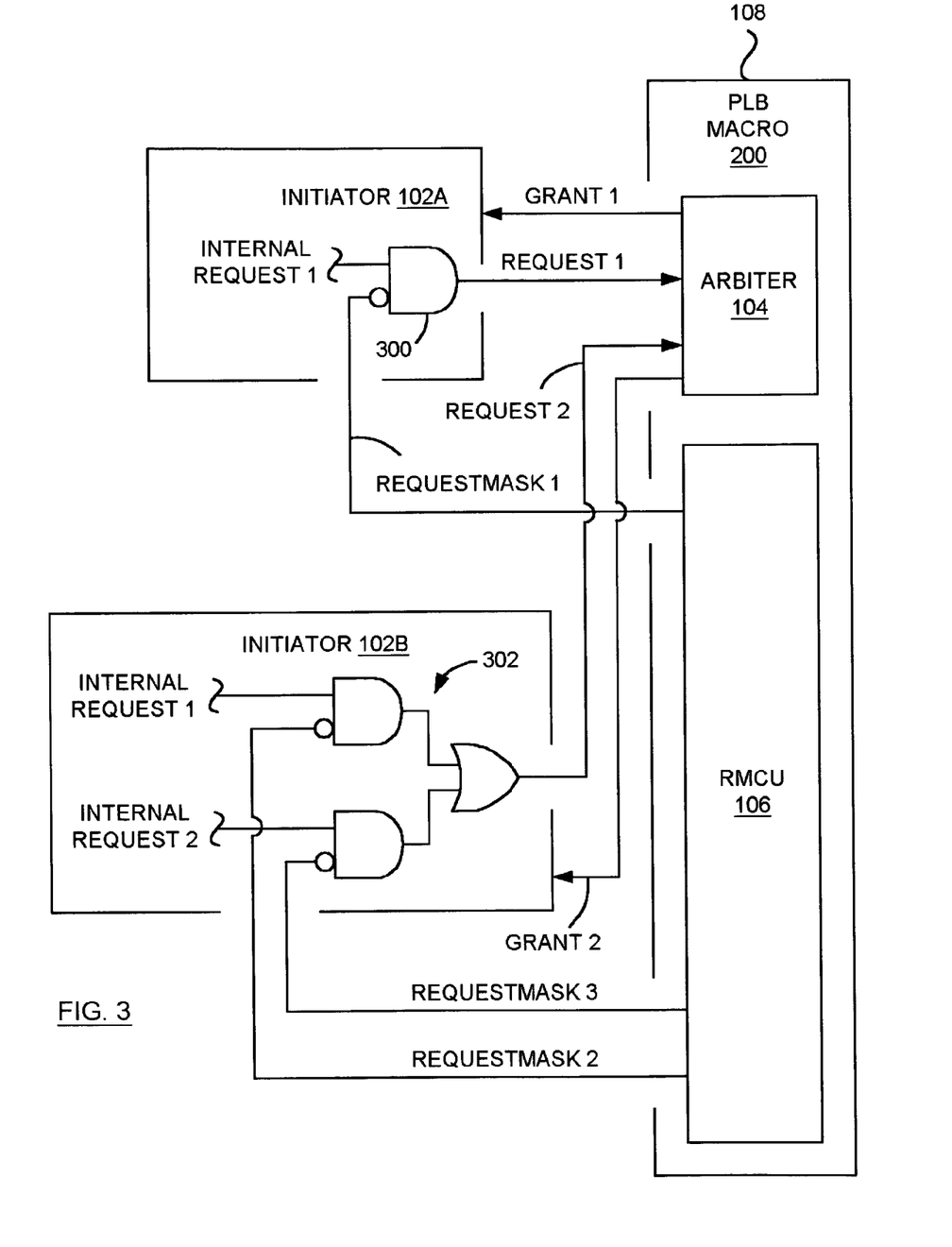
FIG. 3 is a diagram of a portion of the electronic system of FIG. 2, illustrating one embodiment wherein two of the initiators receive RequestMask signals from the RMCU, and logic within the initiators prevents the initiators from repeating retried requests via the PLB when the received RequestMask signals are asserted.

FIG. 3 is a diagram of a portion of the electronic system 100 of FIG. 2, illustrating one embodiment wherein the initiator 102A and the initiator 102B receive RequestMask signals from the RMCU 106, and logic within the initiator 102A and the initiator 102B prevents the initiators 102A and 102B from repeating retried requests via the PLB when the received RequestMask signals are asserted.

In the embodiment of FIG. 3, the initiator 102A can only have a single pending request at any given time. The initiator 102A generates an 'INTERNAL REQUEST 1' signal, corresponding to the single pending request, when the initiator 102A needs to use the PLB. The initiator 102A receives a 'REQUESTMASK 1' signal from the RMCU 106 when the initiator 102A is to be prevented from reinitiating a request via the PLB and provides a 'REQUEST 1' signal to the arbiter 104. The arbiter 104 provides a 'GRANT 1' signal to the initiator 102A when the initiator 102A can initiate a request via the PLB. It is noted that in the embodiment of FIG. 3, all signals are asserted when at a high voltage level (i.e., a logic '1').

Logic 300 within the initiator 102A essentially gates the REQUESTMASK 1 signal to produce the REQUEST 1 signal. When the REQUESTMASK 1 signal from the RMCU 106 is deasserted, the REQUEST 1 signal has the value of the INTERNAL REQUEST 1, thus the REQUEST 1 signal provided to the arbiter 104 is asserted when the INTERNAL REQUEST 1 signal is asserted (i.e., when the initiator 102A needs to use the PLB).

The initiator 102B can have two pending requests at any given time. The initiator 102B generates either an 'INTERNAL REQUEST 1' signal, corresponding to a first of the pending requests, or an 'INTERNAL REQUEST 2' signal, corresponding to the second pending request, when the initiator 102B needs to use the PLB. The initiator 102B receives a 'REQUESTMASK 2' signal from the RMCU 106 when the initiator 102B is to be prevented from reinitiating the first pending request via the PLB, and receives a 'REQUESTMASK 3' signal from the RMCU 106 when the initiator 102B is to be prevented from reinitiating the second pending request via the PLB. The initiator 102B provides a 'REQUEST 2' signal to the arbiter 104. The arbiter 104 provides a 'GRANT 2' signal to the initiator 102B when the initiator 102B can initiate a request via the PLB.

Logic 302 within the initiator 102B uses the INTERNAL REQUEST 1, the INTERNAL REQUEST 2, the REQUESTMASK 2, and the REQUESTMASK 3 signals to produce the REQUEST 2 signal. The REQUEST 2 signal provided to the arbiter 104 is asserted when either (i) the REQUESTMASK 2 signal is deasserted and the INTERNAL REQUEST 1 is asserted, or (ii) the REQUESTMASK 3 signal is deasserted and the INTERNAL REQUEST 2 is asserted.

Figure 4:
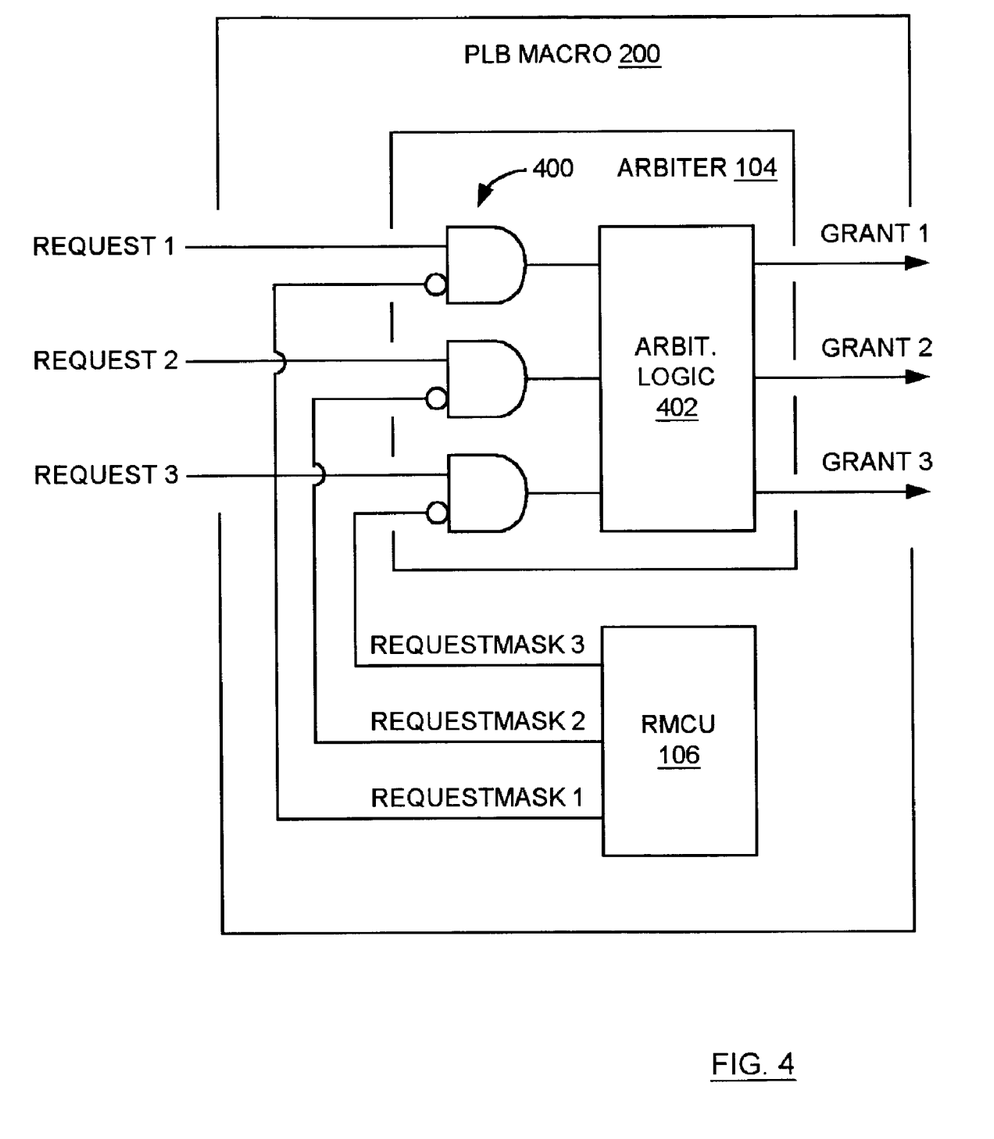
FIG. 4 is a diagram of a portion of the electronic system of FIG. 2, illustrating one embodiment wherein the arbiter receives RequestMask signals from the RMCU, and wherein the arbiter is prevented from receiving request signals from corresponding initiators when the RequestMask signals are asserted.

FIG. 4 is a diagram of a portion of the electronic system 100 of FIG. 2, illustrating one embodiment wherein the arbiter 104 receives RequestMask signals from the RMCU 106, and wherein the arbiter 104 is prevented from receiving request signals from corresponding initiators 102 when the RequestMask signals are asserted. As a result, the arbiter 104 does not provide grant signals to the corresponding initiators 102 when the RequestMask signals are asserted, and the corresponding initiators 102 are prevented from repeating retried requests via the PLB when RequestMask signals are asserted.

In the embodiment of FIG. 4, each of the initiators 102A–102C (FIGS. 1–2) can have only a single request pending at any given time. The initiator 102A provides a 'REQUEST 1' signal to the arbiter 104 when the initiator 102A needs to use the PLB. Similarly, the initiator 102B provides a 'REQUEST 2' signal to the arbiter 104 when the initiator 102B needs to use the PLB, and the initiator 102C provides a 'REQUEST 3' signal to the arbiter 104 when the initiator 102C needs to use the PLB. It is noted that in the embodiment of FIG. 4, all signals are asserted when at a high voltage level (i.e., a logic '1').

The arbiter 104 provides a 'GRANT 1' signal to the initiator 102A when the initiator 102A can initiate a request via the PLB. Similarly, the arbiter 104 provides a 'GRANT 2' signal to the initiator 102B when the initiator 102B can initiate a request via the PLB, and provides a 'GRANT 3' signal to the initiator 102C when the initiator 102C can initiate a request via the PLB.

The RMCU 106 provides a 'REQUESTMASK 1' signal to the arbiter 104 when the initiator 102A is to be prevented from reinitiating a request via the PLB. Similarly, the RMCU 106 provides a 'REQUESTMASK 2' signal to the arbiter 104 when the initiator 102B is to be prevented from reinitiating a request via the PLB, and provides a 'REQUESTMASK 3' signal to the arbiter 104 when the initiator 102C is to be prevented from reinitiating a request via the PLB.

Logic 400 within the arbiter 104 essentially gates the REQUEST 1, the REQUEST 2, and the REQUEST 3 signals provided to arbitration logic 402 of the arbiter 104. As a result, the arbitration logic 402 only receives an asserted request signal from the initiator 102A when the REQUEST 1 signal produced by the initiator 102A is asserted and the REQUESTMASK 1 signal from the RMCU 106 is deasserted. The arbitration logic 402 is prevented from receiving an asserted request signal from the initiator 102A when the REQUESTMASK 1 signal from the RMCU 106 is asserted, thus the arbiter 104 does not assert the GRANT 1 signal to the initiator 102A when the REQUESTMASK 1 signal from the RMCU 106 is asserted.

Similarly, the arbitration logic 402 only receives an asserted request signal from the initiator 102B when the REQUEST 2 signal produced by the initiator 102B is asserted and the REQUESTMASK 2 signal from the RMCU 106 is deasserted. The arbitration logic 402 is prevented from receiving an asserted request signal from the initiator 102B when the REQUESTMASK 2 signal from the RMCU 106 is asserted, thus the arbiter 104 does not assert the GRANT 2 signal to the initiator 102B when the REQUESTMASK 2 signal from the RMCU 106 is asserted.

Further, the arbitration logic 402 only receives an asserted request signal from the initiator 102C when the REQUEST 3 produced by the initiator 102C is asserted and the REQUESTMASK 3 signal from the RMCU 106 is deasserted. The arbitration logic 402 is prevented from receiving an asserted request signal from the initiator 102C when the REQUESTMASK 3 signal from the RMCU 106 is asserted, thus the arbiter 104 does not assert the GRANT 3 signal to the initiator 102C when the REQUESTMASK 3 signal from the RMCU 106 is asserted.

Figure 5:
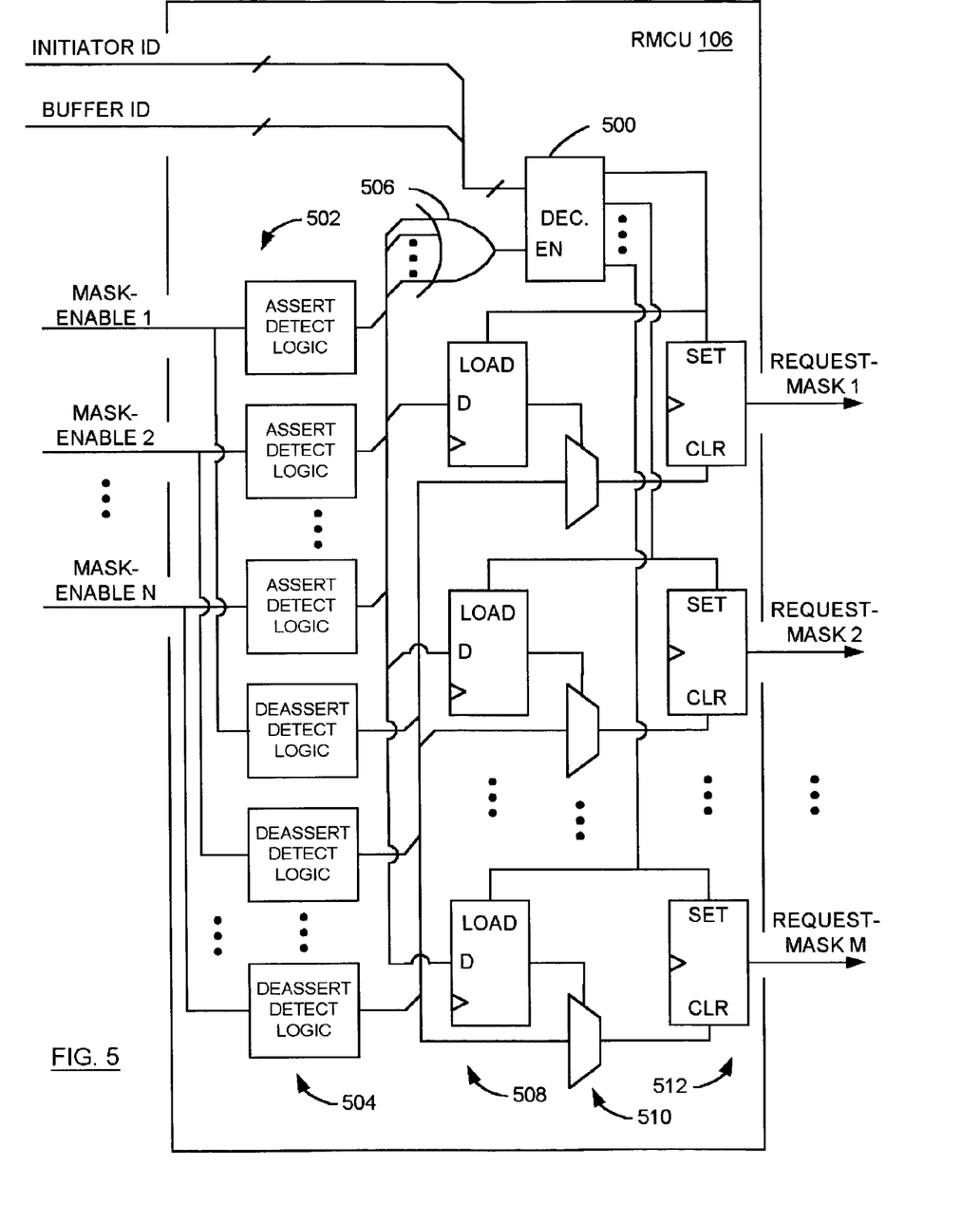
FIG. 5 is a diagram of one embodiment of the RMCU of FIGS. 2–4.

FIG. 5 is a diagram of one embodiment of the RMCU 106 of FIGS. 1–4. As described above, when making a request to the PLB macro 200 (FIG. 2), an initiator 102 (FIGS. 1–3) provides a BufferID to the PLB 200. In general, the BufferID identifies the pending request. For example, the BufferID may be a unique value among the possibly multiple requests that the initiator can have pending to the PLB at one time. When the PLB macro 200 grants an initiator 102 use of the PLB, the PLB macro 200 generates an InitiatorID identifying the initiator 102 granted use.

As indicated in FIG. 5, the RMCU 106 receives the 'INITIATOR ID' and the 'BUFFER ID' of each request initiated via the PLB, and uses the INITIATOR ID and the BUFFER ID to generate one or more 'REQUESTMASK' signals numbered '1' through 'M' in FIG. 5. In the embodiment of FIG. 5, the INITIATOR ID and the BUFFER ID are provided to a decoder 500 as inputs. It is noted that in the embodiment of FIG. 5, all signals are asserted when at a high voltage level (i.e., a logic '1').

The RMCU 106 also receives multiple 'MASKENABLE' signals numbered '1' through 'N' in FIG. 5 from the targets 110 (FIGS. 1–2). The MASKENABLE signals are provided to assertion detection logic 502 and to deassertion detection logic 504. The 'N' outputs of the assertion detection logic 502 are provided to an OR gate 506 as inputs, and an output of the OR gate 506 is provided to the decoder 500 as an enable control signal. The decoder 500 is enabled as long as any of the 'N' MASKENABLE signals is asserted.

Selected ones of the 'N' outputs of the assertion detection logic 502 are used to form inputs to 'M' D flip-flops 508. Each of the 'M' D flip-flops 508 is used to generate a corresponding one of the 'M' REQUESTMASK signals. For example, the 'N' outputs of the assertion detection logic 502 may be logically combined to form the inputs to the 'M' D flip-flops 508. If one of the MASKENABLE signals used to form an input to one of the D flip-flops 508 is asserted during a cycle of a clock signal, an output of the D flip-flop 508 is asserted during the next clock cycle. The 'M' outputs of the 'M' D flip-flops 508 are provided to a corresponding one of 'M' multiplexers 510 as control signals.

Selected ones of the 'N' outputs of the deassertion detection logic 504 are used to form inputs to the 'M' multiplexers 510. Each of the 'M' multiplexers 510 is used to generate a corresponding one of the 'M' REQUESTMASK signals. For example, the 'N' outputs of the deassertion detection logic 504 may be logically combined to form the inputs to the 'M' multiplexers 510.

The decoder 500 produces 'M' outputs, each corresponding to a different one of the 'M' REQUESTMASK signals. Each output of the decoder 500 is provided to a different one of the 'M' D flip-flops 508 as a load control signal and to the corresponding one of the 'M' flip-flops 512 as a set control signal. The outputs of the 'M' multiplexers 510 are provided to the corresponding one of the 'M' flip-flops 512 as a clear control signal. Each of the 'M' flip-flops 512 produces a corresponding one of the 'M' REQUESTMASK signals.

In the embodiment of FIG. 5, when a target 110 (FIG. 2) receives a request via the PLB, and the target 110 cannot complete the request, and a pre-defined masking situation exists within the target 110 that indicates the initiator 102 of the request should not attempt the request again via the PLB, the target 110 signals a retry during a cycle of a synchronizing clock signal of the PLB. During the next clock cycle, the target 110 asserts the MASKENABLE signal associated with masking situation. The RMCU 106 receives the INITIATOR ID and the BUFFER ID associated with the request from the PLB macro 200 (FIGS. 2–4) and detects the asserted MASKENABLE signal. The logic of FIG. 5 within the RMCU 106 uses the INITIATOR ID, the BUFFER ID, and the MASKENABLE signals to assert one or more of the REQUESTMASK signals directed to the initiator 102 identified by the INITIATOR ID and corresponding to the request number identified by the BUFFER ID.

Figure 6:
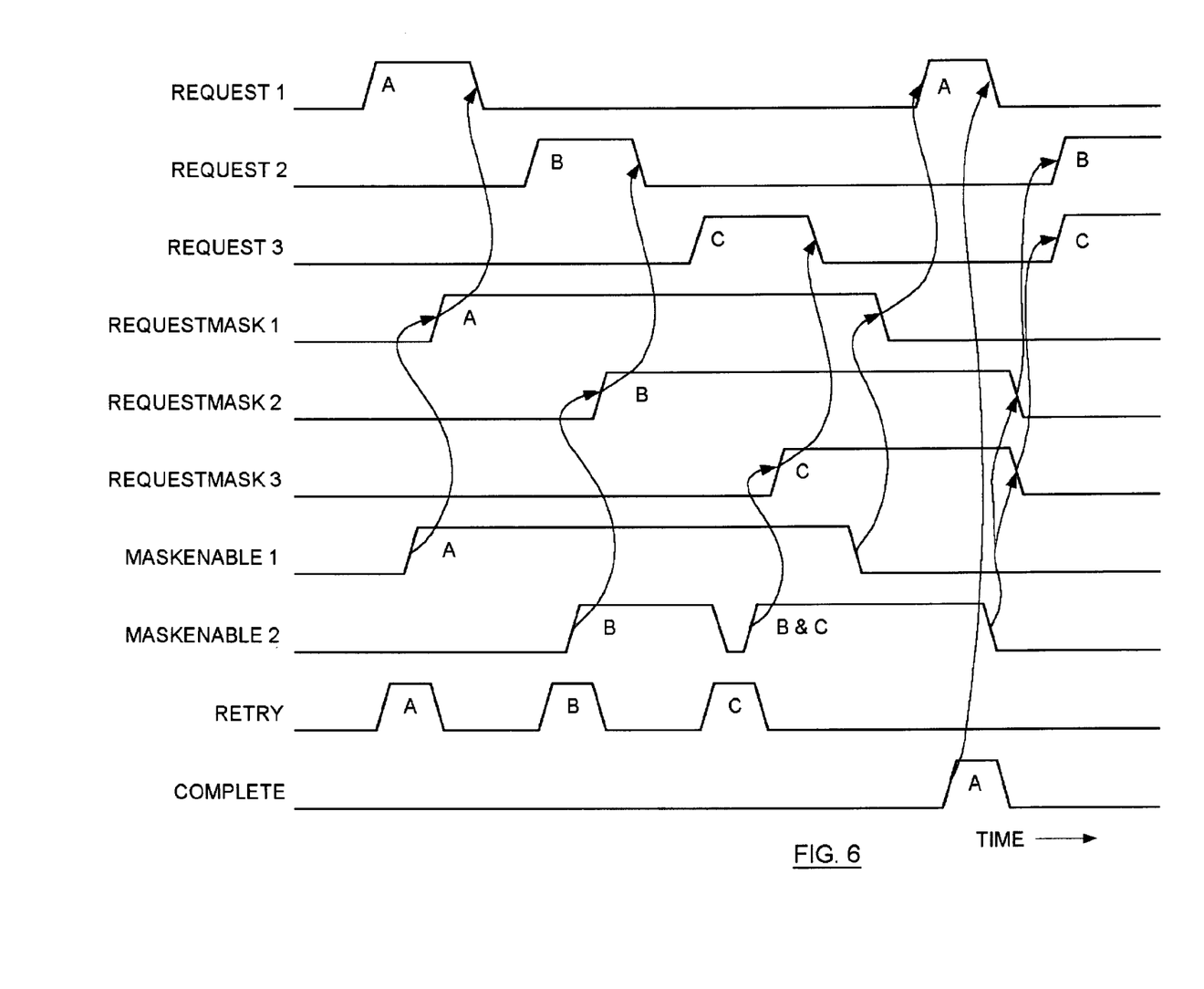
FIG. 6 is an exemplary timing diagram illustrating timing relationships between various signals within the electronic system of FIG. 1 as requests are initiated and completed via the system bus.

FIG. 6 is an exemplary timing diagram illustrating timing relationships between various signals within the electronic system 100 of FIG. 1 as requests are initiated and completed via the system bus 108. In the embodiment of FIG. 6, each of the initiators 102 (FIG. 1) can have only one request pending at any given time, and all requests are directed to the target 110A (FIG. 1). A 'MASKENABLE 1' signal generated by the target 110A is associated with a "delayed read request" masking situation within the target 110A, and a 'MASKENABLE 2' signal generated by the target 110A is associated with a "no read buffer available" masking situation within the target 110A. It is noted that in the embodiment of FIG. 6, all signals are asserted when at a high voltage level (i.e., a logic '1').

In the embodiment of FIG. 6, the RMCU 106 (FIG. 1) provides a 'REQUESTMASK 1' signal to the initiator 102A (FIG. 1) when the initiator 102A is to be prevented from reinitiating a request via the system bus 108 (FIG. 1). Similarly, the RMCU 106 provides a 'REQUESTMASK 2' signal to the initiator 102B (FIG. 1) when the initiator 102B is to be prevented from reinitiating a request via the system bus 108, and the RMCU 106 provides a 'REQUESTMASK 3' signal to the initiator 102C (FIG. 1) when the initiator 102C is to be prevented from reinitiating a request via the system bus 108.

Initially, the electronic system 100 (FIG. 1) is idle, and all signals are deasserted. The initiator 102A (FIG. 1), denoted as 'A' in FIG. 6, then initiates a read request, denoted as 'REQUEST 1' in FIG. 6, directed to the target 110A. The target 110A (FIG. 1) receives the REQUEST 1, queues the delayed read request, retries the REQUEST 1 via the system bus 108 (FIG. 1), and asserts the MASKENABLE 1 signal (e.g., during a subsequent cycle of a synchronizing clock signal of the system bus 108), as indicated in FIG. 6.

The RMCU 106 (FIG. 1) receives the asserted MASKENABLE 1 signal following the retry of the REQUEST 1 by the target 110 (FIG. 1) and responds by asserting the REQUESTMASK 1 signal, as indicated in FIG. 6. The initiator 102A (FIG. 1) receives the asserted REQUESTMASK 1 signal and responds by ceasing to reinitiate the REQUEST 1 signal, as indicated in FIG. 6.

The initiator 102B (FIG. 1), denoted as 'B' in FIG. 6, then initiates a read request 'REQUEST 2' directed to the target 110A, as indicated in FIG. 6. The target 110A (FIG. 1) receives the REQUEST 1, determines the read buffer is full, retries the REQUEST 2 via the system bus 108 (FIG. 1), and asserts the MASKENABLE 2 signal (e.g., during the next cycle of the clock signal), as indicated in FIG. 6.

The RMCU 106 (FIG. 1) receives the asserted MASKENABLE 2 signal following the retry of the REQUEST 2 by the target 110 (FIG. 1) and responds by asserting the REQUESTMASK 2 signal, as indicated in FIG. 6. The initiator 102B (FIG. 1) receives the asserted REQUESTMASK 2 signal and responds by ceasing to reinitiate the REQUEST 2 signal, as indicated in FIG. 6.

The initiator 102C (FIG. 1), denoted as 'C' in FIG. 6, then initiates a read request 'REQUEST 3' directed to the target 110A, as indicated in FIG. 6. The target 110A (FIG. 1) receives the REQUEST 1, determines the read buffer is still full, retries the REQUEST 3 via the system bus 108 (FIG. 1) while deasserting the MASKENABLE 2 signal, and asserts the MASKENABLE 2 signal (e.g., during the next cycle of the clock signal), as indicated in FIG. 6.

The RMCU 106 (FIG. 1) receives the asserted MASKENABLE 2 signal following the retry of the REQUEST 2 by the target 110 (FIG. 1) and responds by asserting the REQUESTMASK 3 signal, as indicated in FIG. 6. The initiator 102C (FIG. 1) receives the asserted REQUESTMASK 3 signal and responds by ceasing to reinitiate the REQUEST 3 signal, as indicated in FIG. 6. Afterward, all three REQUESTs are masked, all three REQUESTMASK signals are asserted, and the system bus 108 (FIG. 1) is idle.

The target 110 (FIG. 1) then receives data associated with the queued delayed read and deasserts the MASKENABLE 1 signal. The RMCU 106 (FIG. 1) receives the deassertion of the MASKENABLE 1 signal (e.g., for two clock cycles) and responds by deasserting the REQUESTMASK 1 signal. The initiator 102A receives the deasserted REQUESTMASK signal and reinitiates REQUEST 1 via the system bus 108, as indicated in FIG. 6. The target 110 (FIG. 1) receives the reinitiated REQUEST 1 and completes the REQUEST 1, as indicated in FIG. 6, by providing the data to the initiator 102A.

The target 110 (FIG. 1) then detects availability of the read data buffer and deasserts the MASKENABLE 2 signal. The RMCU 106 (FIG. 1) detects the deassertion of MASKENABLE 2 signal (e.g., for two clock cycles) and responds by deasserting the corresponding REQUESTMASK 2 and REQUESTMASK 3 signals. The initiator 102B responds to the deasserted REQUESTMASK 2 signal by reinitiating the REQUEST 2 via the system bus 108 (FIG. 1), and the initiator 102C responds to the deasserted REQUESTMASK 3 signal by reinitiating the REQUEST 3 via the system bus 108. The REQUEST 2 and the REQUEST 3 may be completed in a manner similar to that of REQUEST 1.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An electronic system, comprising:
   a plurality of initiators coupled to a bus and configured to initiate requests via the bus;
   a target coupled to the bus, wherein the target is configured to receive requests from the initiators via the bus and to produce one of at least three unique MaskEnable signals wherein each of the MaskEnable signals is generated following an initial request and dependent on a corresponding unique masking situation within the target;
   a request mask control unit (RMCU) coupled to receive the MaskEnable signals and configured to:
      produce a plurality of RequestMask signals dependent upon the MaskEnable signals, and
      employ at least one protocol for each initiator, wherein the at least one protocol is selected from a retry protocol or a delayed transaction protocol;
   wherein at least one of the initiators is permitted to repeat requests via the bus dependent upon at least one of the RequestMask signals.

2. The electronic system as recited in claim 1, wherein at least one of the initiators is coupled to receive at least one of the RequestMask signals and configured to repeat requests via the bus dependent upon the at least one RequestMask signal.

3. The electronic system as recited in claim 1, further comprising an arbiter coupled to the bus and configured to provide an enable signal to each of the initiators and to assert the enable signal provided to a selected one of the initiators when the selected initiator is permitted to initiate a request via the bus, wherein the arbiter is coupled to receive at least one of the RequestMask signals and is configured to assert the enable signal provided to at least one of the initiators dependent upon the at least one RequestMask signal.

4. The electronic system as recited in claim 1, wherein following an initial request from one of the initiators, and in response to one of the masking situations within the target, the target generates the corresponding MaskEnable signal, and the RMCU generates a RequestMask signal directed to the one of the initiators, and the RequestMask signal prevents the one of the initiators from repeating the request via the bus.

5. The electronic system as recited in claim 1, wherein one of the masking situations is a delayed read masking situation occurring when a read request is to be queued.

6. The electronic system as recited in claim 5, wherein the delayed read masking situation occurs when an initial request received from one of the initiators is a read request, a read buffer within the target is available, and the read request is to be queued.

7. The electronic system as recited in claim 1, wherein one of the masking situations is a no read buffer available masking situation occurring when an initial request received from one of the initiators is a read request and a read buffer is not available within the target.

8. The electronic system as recited in claim 1, wherein one of the masking situations is a no write buffer available masking situation occurring when an initial request received from one of the initiators is a write request and a write buffer is not available within the target.

9. The electronic system as recited in claim 1, wherein the electronic system is a computer system.

10. The electronic system as recited in claim 1, wherein the requests comprise read requests and write requests.

11. The electronic system as recited in claim 1, wherein a protocol of the bus allows the target to signal a 'retry' to an initiator when the target is not ready to complete a request received from the initiator.

12. The electronic system as recited in claim 11, wherein in the event the target receives a request that will incur a delay, the protocol allows the target to signal a 'retry' to the initiator, and start processing the request.

13. A device adapted for coupling to a bus and configured to receive initial requests via the bus, and to respond to the initial requests by producing one of at least three unique MaskEnable signals dependent on a corresponding unique masking situation within the device, wherein the device is configured to employ at least one protocol for each initiator that sends an initial request, wherein the at least one protocol is selected from a retry protocol or a delayed transaction protocol.

14. The device as recited in claim 13, wherein the MaskEnable signals indicate whether one or more initiator devices generating the requests via the bus are to be permitted to repeat the requests.

15. The device as recited in claim 13, wherein the device is a peripheral device.

16. The device as recited in claim 15, wherein the peripheral device is a disk drive, a printer, a scanner, or a modem.

17. The device as recited in claim 15, wherein the peripheral device is a memory controller, an interrupt controller, a bus bridge, or a communication controller.

18. A device adapted for coupling to a bus and configured to initiate requests via the bus, wherein the device receives at least one RequestMask signal following an initial request directed to a target device, and wherein the at least one RequestMask signal is generated dependent on one of at least three unique MaskEnable signals, which represents a corresponding unique masking situation within the target device, and wherein the device is configured to repeat requests via the bus dependent upon the at least one RequestMask signal.

19. The device as recited in claim 18, wherein the device comprises a central processing unit.

20. The device as recited in claim 18, wherein the device is a bus bridge, a direct memory access (DMA) controller, or a communication controller.

21. A method for masking retries from a plurality of initiators to at least one target via a bus, comprising:
  in response to receiving a first request from an initiator, determining by the target if a masking situation exists from a plurality of masking conditions;
  in response to determining that a masking situation exists, asserting by the target a MaskEnable signal that represents the specific masking situation, wherein each masking situation has a unique MaskEnable signal;
  in response to detecting the MaskEnable signal, recording by a request mask control unit (RMCU) which initiator sent the first request as being associated with the MaskEnable signal and asserting a RequestMask signal to the associated initiator, thereby masking further retries of the first request by the associated initiator;
  in response to receiving a second request by the target, repeating the above steps; in response to a masking situation no longer existing, de-asserting by the target the MaskEnable signal representing the masking situation; and
  in response to detecting the de-asserted MaskEnable signal, determining by the RMCU which requests and corresponding initiators are associated with the de-asserted MaskEnable signal and, in response, de-asserting the RequestMask signal for each of the corresponding initiators, thereby allowing the corresponding initiators to retry requests.

22. A method for receiving requests via a bus, comprising:
  receiving an initial request from an initiator device via the bus;
  responding to the initial request by producing one of at least three unique MaskEnable signals, wherein each of the MaskEnable signals is dependent on a corresponding one of a plurality of unique masking situations; and
  wherein the MaskEnable signals indicate whether the initiator device is permitted to repeat the request via the bus.

23. A method for communicating via a bus, comprising:
  initiating an initial request via the bus;
  receiving the initial request via the bus;
  responding to the initial request by producing one of at least three unique MaskEnable signals, wherein each of the MaskEnable signals is dependent on a corresponding one of a plurality of unique masking situations;
  using the MaskEnable signals to produce a plurality of RequestMask signals;
  receiving at least one of the RequestMask signals; and
  permitting the request to be repeated via the bus dependent upon the at least one RequestMask signals.

* * * * *